United States Patent
Sternberger et al.

(10) Patent No.: US 7,857,093 B2
(45) Date of Patent: Dec. 28, 2010

(54) ENGINE INLET DEEP ACOUSTIC LINER SECTION

(75) Inventors: Joe E. Sternberger, Wichita, KS (US); John T. Strunk, Derby, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 30 days.

(21) Appl. No.: 12/405,387

(22) Filed: Mar. 17, 2009

(65) Prior Publication Data
US 2010/0236862 A1   Sep. 23, 2010

(51) Int. Cl.
F02K 1/02 (2006.01)
E04B 1/82 (2006.01)
F02K 1/78 (2006.01)
B64D 33/02 (2006.01)
E04B 1/74 (2006.01)

(52) U.S. Cl. ............... 181/213; 181/214; 181/292; 244/53 B; 415/119

(58) Field of Classification Search ........... 181/213, 181/214, 222, 224, 292, 288, 296; 244/1 N, 244/53 B; 415/119
See application file for complete search history.

(56) References Cited

U.S. PATENT DOCUMENTS

| | | | | |
|---|---|---|---|---|
| 3,353,626 A | * | 11/1967 | Lothar Cremer et al. | 181/224 |
| 3,819,008 A | * | 6/1974 | Evans et al. | 181/214 |
| 3,948,346 A | * | 4/1976 | Schindler | 181/286 |
| 4,091,892 A | * | 5/1978 | Hehmann et al. | 181/286 |
| 4,106,587 A | * | 8/1978 | Nash et al. | 181/213 |
| 4,122,672 A | * | 10/1978 | Lowrie | 60/226.1 |
| 4,421,201 A | * | 12/1983 | Nelsen et al. | 181/214 |
| 4,484,856 A | * | 11/1984 | Patacca | 415/9 |
| 4,531,362 A | * | 7/1985 | Barry et al. | 60/226.1 |
| 4,645,032 A | * | 2/1987 | Ross et al. | 181/250 |
| 5,041,323 A | * | 8/1991 | Rose et al. | 428/116 |
| 5,997,985 A | * | 12/1999 | Clarke et al. | 428/116 |
| 6,557,799 B1 | | 5/2003 | Sternberger | |
| 6,619,913 B2 | * | 9/2003 | Czachor et al. | 415/119 |
| 6,871,725 B2 | * | 3/2005 | Johnson | 181/292 |

FOREIGN PATENT DOCUMENTS

EP   1310658   5/2003

\* cited by examiner

*Primary Examiner*—Edgardo San Martin
(74) *Attorney, Agent, or Firm*—Hovey Williams LLP

(57) ABSTRACT

An inlet of an aircraft nacelle having an acoustic barrel configured to reduce engine fan flutter by attenuating various frequencies. The acoustic barrel may comprise an acoustic panel of a honeycomb configuration sandwiched between a first back sheet and a face sheet and extending from a forward bulkhead to an aft bulkhead of the inlet. The acoustic barrel may further comprise a deep liner section bonded to and sandwiched between the first back sheet and a second back sheet. The deep liner section may have a narrower width than the acoustic panel and may be located proximate the aft bulkhead. The sections of the first back sheet, the face sheet, and a septum of the acoustic panel may be perforated and may contain additional holes formed in portions aligned radially inward of the deep liner section.

24 Claims, 3 Drawing Sheets

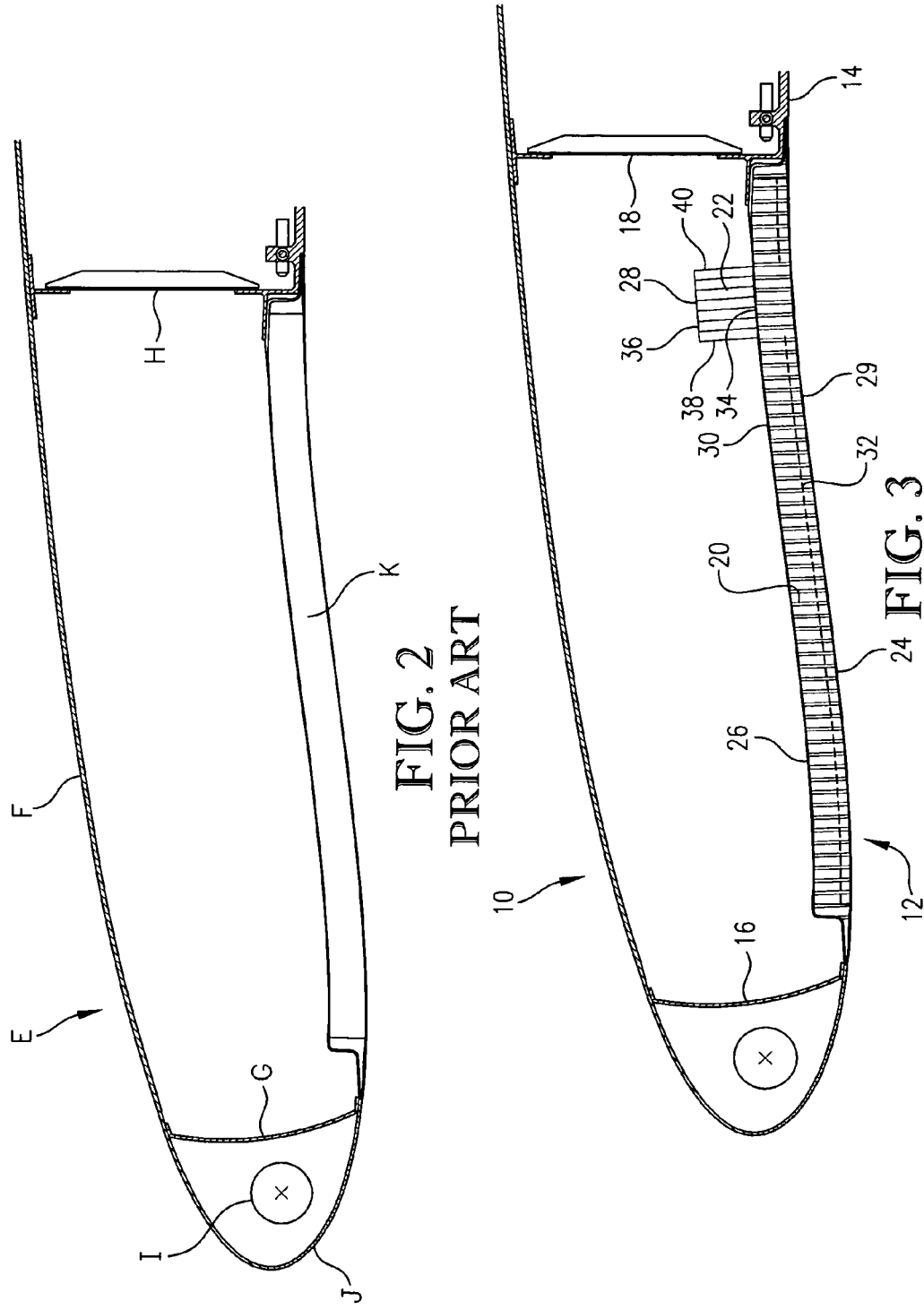

US 7,857,093 B2

ENGINE INLET DEEP ACOUSTIC LINER SECTION

BACKGROUND

1. Field

The present invention relates to aircraft components. More particularly, the invention relates to an apparatus for improving acoustic attenuation within an inlet of a nacelle.

2. Related Art

An aircraft nacelle (A) surrounds an aircraft's engine (B) and typically comprises a fan cowl (C), a thrust reverser (D), and an inlet (E), as illustrated in FIG. 1. The inlet (E) typically comprises an outer barrel panel (F), a forward bulkhead (G), an aft bulkhead (H), a thermal anti-ice spray tube (I), a lip skin (J), and an acoustic barrel (K), also referred to as an acoustic panel, as illustrated in FIG. 2.

The acoustic barrel (K) is designed to provide acoustic attenuation, reducing engine and engine fan noise. For example, the acoustic barrel (K) can be made of a sandwich honeycomb panel, shaped to comprise a plurality of honeycomb cells. However, prior art acoustic panels are insufficient under certain conditions for reducing fan flutter cause by certain engine fan harmonics.

Accordingly, there is a need for an apparatus and method for reducing fan flutter caused by engine fan harmonics of an aircraft that overcomes the limitations of the prior art.

SUMMARY

One embodiment of the present invention is an acoustic barrel for use between a forward bulkhead and an aft bulkhead in an inlet of an aircraft nacelle. The acoustic barrel may comprise an acoustic panel, a deep liner section, a first back sheet, a second back sheet, and a face sheet.

The acoustic panel may have a honeycomb configuration, an inner face, and an outer face, and may extend from the forward bulkhead to the aft bulkhead of the inlet. The acoustic panel may be a sandwich honeycomb core comprising a plurality of honeycomb cells and an acoustic septum. The septum may traverse at least a portion of the honeycomb cells, but may be configured to not traverse the honeycomb cells of the acoustic panel that are radially inward of the deep liner section. The deep liner section may be positioned outward of the acoustic panel and may be substantially narrower in width than the acoustic panel. The deep liner section may also have a honeycomb configuration, an inner face, and an outer face.

The deep liner section may be positioned closer to the aft bulkhead than to the forward bulkhead. The acoustic panel and the deep liner section may each form 360-degree rings of a particular width and depth. For example, the depth of the deep liner section from the inner face of the deep liner section to the outer face of the deep liner section may be between approximately 0.5 inches and 10 inches or between approximately 1 inch and 4 inches. The width of the deep liner section from a first surface of the deep liner section facing the forward bulkhead to a second surface of the deep liner section facing the aft bulkhead may be between approximately 0.5 inches and 6 inches or between approximately 1 inch and 3 inches.

The first back sheet may substantially cover the outer face of the acoustic panel and may be positioned between and bonded to both the acoustic panel and the deep liner section. A plurality of holes or perforations may be formed into a portion of the first back sheet directly radially inward of and adjacent to the deep liner section, while other portions of the first back sheet not located directly between the deep liner section and the acoustic panel may be impervious. The second back sheet may be impervious and may cover and be bonded to the outer face of the deep liner section. The face sheet may cover and be bonded to the inner face of the acoustic panel, and may be substantially perforated, with larger perforations or holes located radially inward of the deep liner section.

The acoustic barrel may be useful in a method for attenuating frequencies in a nacelle. The method may comprise bonding a first back sheet to an outer face of an acoustic panel and bonding a deep liner section to the first back sheet. Additionally, the method may comprise forming holes in the first back sheet throughout a portion of the first back sheet that is disposed between the deep liner section and the acoustic panel and forming holes into a portion of a face sheet radially inward of the deep liner section. Finally, the method may comprise attaching the acoustic barrel to an inlet of a nacelle.

These and other important aspects of the present invention are described more fully in the detailed description below.

BRIEF DESCRIPTION OF THE DRAWINGS

Embodiments of the present invention are described in detail below with reference to the attached drawing figures, wherein:

FIG. 2 is a fragmentary cross-sectional view of an inlet of the prior art nacelle of FIG. 1;

FIG. 3 is a fragmentary cross-sectional view of an inlet constructed in accordance with an embodiment of the present invention.

Figure 1:
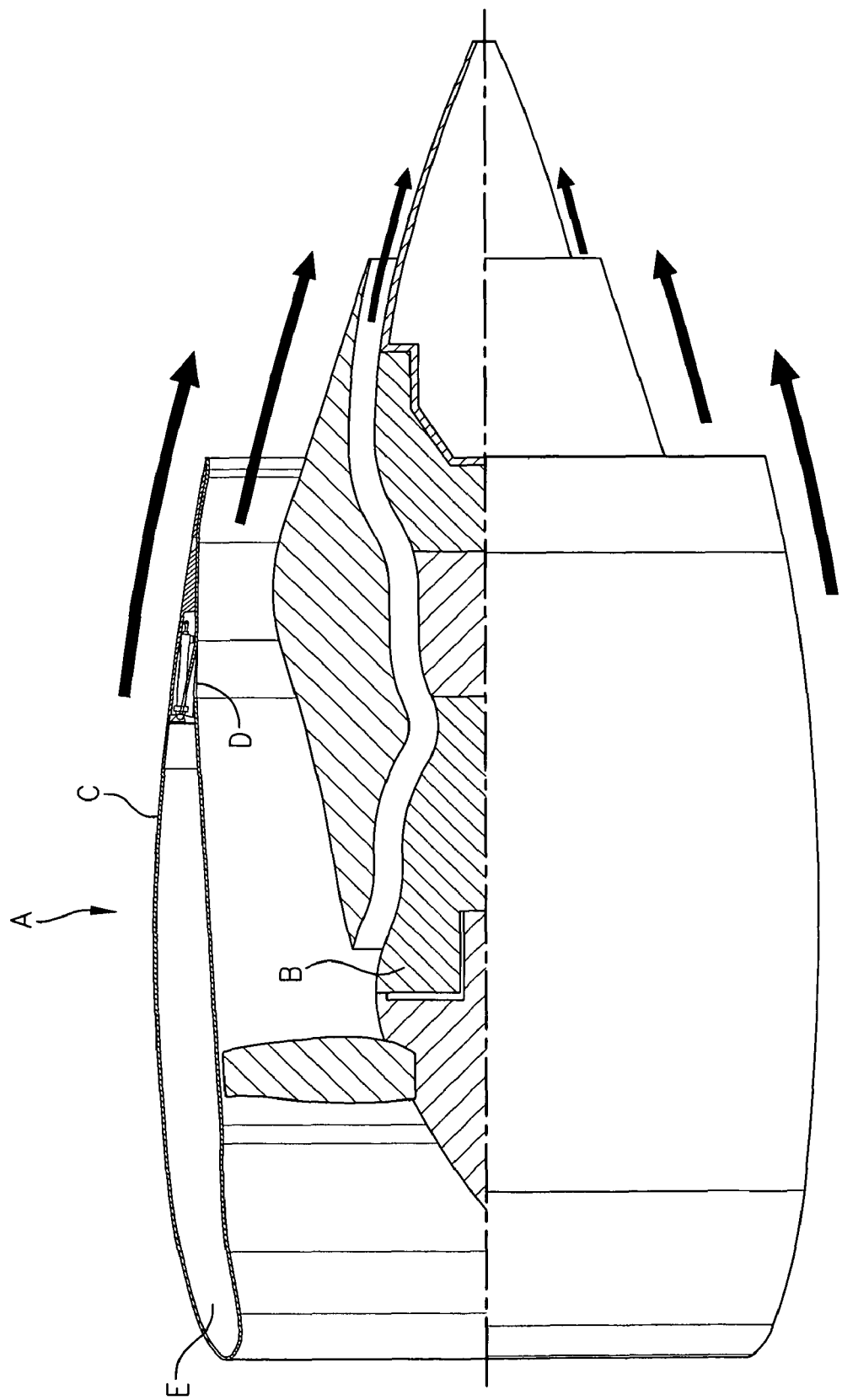
FIG. 1 is a cross-sectional view of a prior art nacelle.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIG. 3 illustrates an inlet 10 of a nacelle constructed in accordance with an embodiment of the invention. The inlet 10 comprises an acoustic barrel 12 forming at least a portion of an inner wall 14 of the inlet 10, a forward bulkhead 16, and an aft bulkhead 18. The acoustic barrel may form a substantially continuous 360-degree ring within the inlet 10 and may have a width generally extending between the forward bulkhead 16 and the aft bulkhead 18. The acoustic barrel 12 may comprise at least one acoustic panel 20, a deep liner section 22, a face sheet 24, a first back sheet 26, and a second back sheet 28.

The acoustic panel 20 may be composed of any honeycomb core material known in the art, such as various types of metals, plastics, and or paper formed into a plurality of cross-sectionally hexagonal-shaped honeycomb cells integral to each other. Each honeycomb cell may have any diameter and may alternatively have a cross-sectional shape other than hexagonal. In one embodiment of the invention, the honeycomb cells may each have a cross-sectional diameter of between approximately 0.1 inches and 1 inch in diameter, or between approximately 0.2 inches and 0.5 inches.

The acoustic panel 20 may have an inner face 29 located at the inner wall 14 of the inlet 10 and an outer face 30 opposite of the inner face 29. The depth of the acoustic panel 20 from the inner face 29 to the outer face 30 of the acoustic panel 20 may be any depth. For example, the acoustic panel 20 may have a depth between approximately 0.5 inches and 10 inches, or between approximately 1 inch and 4 inches. Additionally, the width of the acoustic panel 20 from the forward bulkhead 16 to the aft bulkhead 18 may be between 0.5 feet and 6 feet, or approximately between 1 foot and 3 feet.

In one embodiment of the invention, the acoustic panel 20 may be a sandwich honeycomb panel having an acoustic septum 32 buried therein, as illustrated in FIG. 3. However, the septum 32 may be omitted without departing from the scope of the invention. The acoustic septum 32 may be a thin material integrated within the acoustic panel 20 and may be a perforated or non-perforated sheet traversing a plurality of honeycomb cells. Honeycomb cells aligned radially inward of the deep liner section 22 may not be traversed by the acoustic septum 32. In one embodiment of the invention, The acoustic septum 32 may be punched out or removed from the honeycomb cells of the acoustic panel 20 that are aligned with the deep liner section 22.

The deep liner section 22 may also comprise any honeycomb core material known in the art, such as various types of metals, plastics, and/or paper formed into a plurality of cross-sectionally hexagonal-shaped honeycomb cells integral to each other. Each honeycomb cell may have any diameter and alternatively may have a cross-sectional shape other than hexagonal. In one embodiment of the invention, the honeycomb cells of the deep liner section 22 may each have a cross-sectional diameter of between approximately 0.1 inches and 1 inch in diameter, or between approximately 0.2 inches and 0.5 inches. In one embodiment of the deep liner section 22, the honeycomb cells may have a cross-sectional diameter of 0.375 inches. The honeycomb cells of the deep liner section 22 may or may not be of the same size and/or in alignment with the honeycomb cells of the acoustic panel 20 without departing from the scope of the invention.

The depth of the deep liner section 22 may extend from an inner face 34, proximate the outer face 30 of the acoustic panel 20, to an outer face 36 of the deep liner section 22. The deep liner section 22 may have any depth. For example, the deep liner section 22 may have a depth between approximately 0.5 inches and 10 inches, or between approximately 1 inch and 4 inches. In one embodiment of the invention, the depth of the deep liner section 22 may be 2.38 inches. Additionally, the width of the deep liner section 22 from a first surface 38 facing the forward bulkhead 16 to a second surface 40 facing the aft bulkhead 18 may be between 0.5 inches and 6 inches, or approximately between 1 inch and 3 inches. In one embodiment of the invention, the width of the deep liner section may be 2 inches.

The deep liner section 22 may be fixed to the acoustic panel 20 at a point proximate the aft bulkhead 18. For example, the deep liner section 22 may be approximately between 0.5 inches and 7 inches away from the aft bulkhead 18. The closer the deep liner section 22 is located to blades of an engine fan, the more attenuation it provides, thereby reducing fan flutter. However, the deep liner section may be located at any point along the acoustic barrel 12 without departing from the scope of this invention.

The face sheet 24 may be one or more perforated sheets of any material, such as graphite epoxy or any material for aircraft construction. The face sheet 24 may cover and be bonded with the acoustic panel 20 along the inner face 29. Bonding, as used herein, may refer to any sort of bonding known in the art, such as chemical bonding, curing together of parts, mechanical fastening of multiple parts, etc. The face sheet 24 may be perforated or non-perforated.

In one embodiment of the invention, a portion of the face sheet 24 located radially inward of the deep liner section 22 may comprise larger perforations than the rest of the face sheet 24. For example, the larger perforations may be holes having a diameter at least slightly smaller than the cross-sectional area of the honeycomb cells of the acoustic panel 20. The spacing of the holes may coordinate with the spacing of the honeycomb cells. The larger perforations may be drilled into the face sheet 24, thereby providing openings through the face sheet 24 to the space within the honeycomb cells of the acoustic panel 20.

The first back sheet 26 may be a sheet of continuous material, such as graphite epoxy or any material for aircraft construction. The first back sheet 26 may cover and be bonded to the outer face 30 of the acoustic panel 20. The first back sheet 26 may be impervious throughout, with the exception of an area or portion of the first back sheet 26 between the deep liner section 22 and the acoustic panel 20.

The first back sheet 26 may be bonded to the deep liner section 22 along the inner face 34 of the deep liner section 22. In one embodiment of the invention, the area of the first back sheet 26 between the deep liner section 22 and the acoustic panel 20 may also comprise large perforations. For example, the large perforations may be holes having a diameter at least slightly smaller than the cross-sectional area of the honeycomb cells of the acoustic panel 20 and/or the deep liner section 22. The large perforations may be drilled into the first back sheet 26 having a spacing coordinating with the spacing of the honeycomb cells, thereby providing openings through the first back sheet 26 to the space within the honeycomb cells of the acoustic panel 20 and/or the deep liner section 22.

The second back sheet 28 may be a sheet of continuous material, such as graphite epoxy or any material for aircraft construction, and may be impervious throughout. The second back sheet 28 may cover and be bonded to the outer face 36 of the deep liner section 22. In one embodiment of the invention, the second back sheet 28 may also extend beyond the outer face 36 to be bonded to the first surface 38 and the second surface 40 of the deep liner section 22. The second back sheet 28 may even bond to or be integrated with the first back sheet 28.

Figure 4:
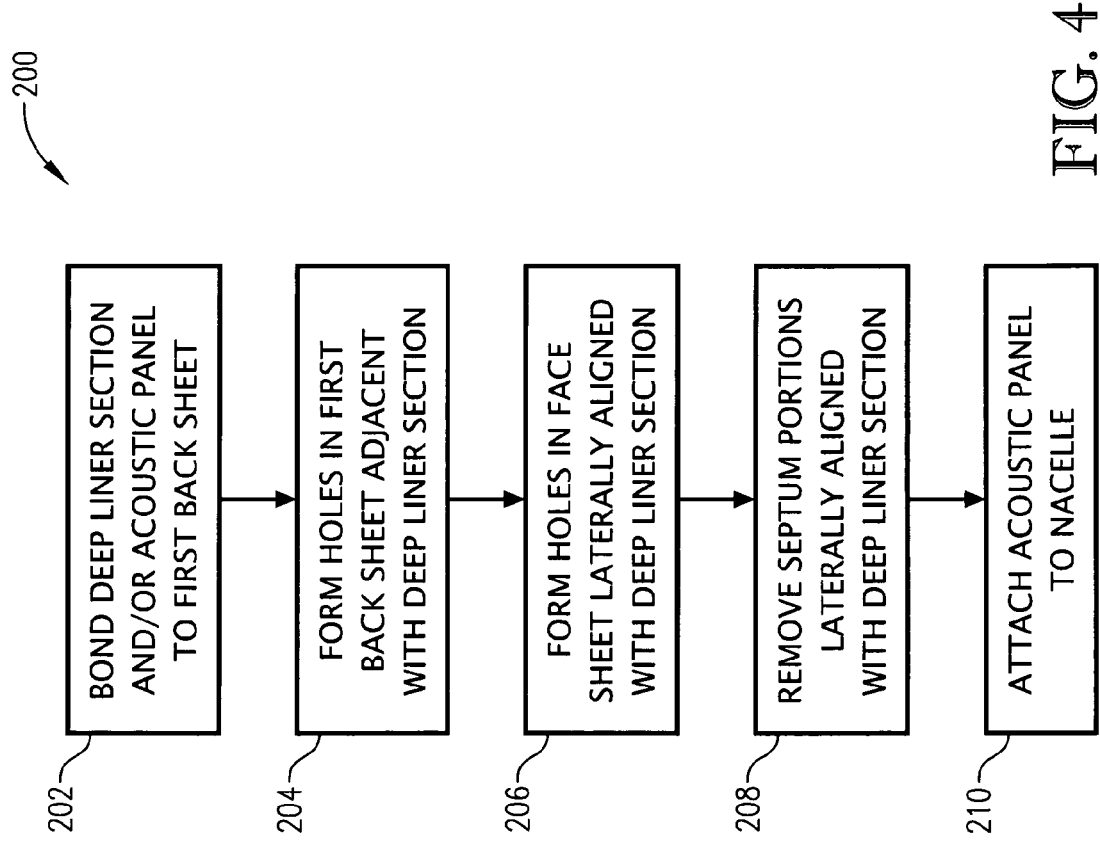
FIG. 4 is a flow chart of a method for constructing the inlet of FIG. 3.

FIG. 4 illustrates a method 200 of reducing fan flutter and attenuating various frequencies in a nacelle. As illustrated in step 202, the method 200 may include bonding the deep liner section 22 and/or the acoustic panel 20 to the first back sheet 26. Step 204 depicts drilling or forming large holes or perforations in a portion of the first back sheet 26 between the deep liner section 22 and the acoustic panel 20, providing openings between the space within the honeycomb cells of the deep liner section 22 and the space within the honeycomb cells of the acoustic panel 20.

The method 200 may further comprise drilling or form large holes or perforations in a portion of the face sheet 24 radially inward of the deep liner section 22, providing openings to the space within the honeycomb cells of the acoustic panel 20, as depicted in step 206. The larger holes or perforations in the face sheet 24 proximate the deep liner section 22, as discussed in step 206, may be larger than the perforations in other portions of the face sheet 24.

The method may also comprise at least partially removing the septum 32 from within honeycomb cells of the acoustic panel 20 that are radially inward of the deep liner section 22, as depicted in step 208. However, in some embodiments of the invention, the acoustic panel 22 may be manufactured such that the septum 32 forms a gap spanning a portion of the acoustic panel 20 that is configured to be radially inward of the deep liner section 22. The steps of method 200 may be performed in any order, and steps may be added or omitted without departing from the scope of the invention. Finally, as depicted in step 210, the method may comprise attaching the acoustic panel 20 to the inlet 10 and/or the nacelle. For example, the acoustic panel 20 may extend between and be attached to the forward bulkhead 16 and the aft bulkhead 18.

The frequencies attenuated by the deep liner section 22 may depend upon: the depth of the deep liner section 22; the width of the deep liner section 22; the proximity of the deep liner section 22 to the engine fan; the material used for the face sheet 24, the first back sheet 26, and/or the second back sheet 28; the area of the perforations in the first back sheet 26 and the face sheet 24; etc. For example, as mentioned above, the closer the deep liner section 22 is located toward the blades of the engine fan, the greater the attenuation of certain frequencies, such as low frequencies, and the greater the reduction in fan flutter. The deep liner section 22 may additionally provide acoustic attenuation while maintaining structural integrity of the acoustic panel 20 via the first back sheet 26.

Although the invention has been described with reference to the embodiments illustrated in the attached drawings, it is noted that equivalents may be employed and substitutions made herein without departing from the scope of the invention as recited in the claims. For example, in some embodiments of the invention, the deep liner section 22 may not form a complete or continuous ring within the nacelle.

Having thus described an embodiment of the invention, what is claimed as new and desired to be protected by Letters Patent includes the following:

1. An acoustic barrel of an aircraft nacelle, the acoustic barrel comprising:
    an acoustic panel having a honeycomb configuration with a plurality of honeycomb cells, an outer face, and an inner face;
    a deep liner section having a honeycomb configuration, an outer face, and an inner face, and positioned outward of the acoustic panel and substantially narrower in width than the acoustic panel;
    a first back sheet substantially covering the outer face of the acoustic panel, positioned between and bonded to both the acoustic panel and the deep liner section, wherein the first back sheet comprises a plurality of holes formed into a portion of the first back sheet radially inward of and adjacent to the deep liner section, wherein the spacing of the holes coordinates with the spacing of the honeycomb cells of the acoustic panel; and
    a second back sheet bonded to and covering the outer face of the deep liner section.

2. The acoustic barrel of claim 1, wherein at least one of the acoustic panel and the deep liner section form a complete 360-degree ring.

3. The acoustic barrel of claim 1, wherein the acoustic panel is a sandwich honeycomb core comprising the plurality of honeycomb cells and an acoustic septum, wherein the septum is buried within the acoustic panel and traverses at least a portion of the plurality of honeycomb cells, wherein the septum does not traverse the honeycomb cells located within an area radially inward of the deep liner section.

4. The acoustic barrel of claim 1, further comprising a face sheet substantially covering the inner face of the acoustic panel.

5. The acoustic barrel of claim 4, wherein the face sheet is substantially perforated, with perforations located radially inward of the deep liner section being larger in size than perforations formed over the rest of the face sheet.

6. The acoustic barrel of claim 1, wherein the deep liner section is located proximate an aft end of the acoustic barrel.

7. The acoustic barrel of claim 1, wherein the second back sheet is impervious.

8. The acoustic barrel of claim 1, wherein a portion of the first back sheet not located between the deep liner section and the acoustic panel is impervious.

9. The acoustic barrel of claim 1, wherein the acoustic panel and the deep liner section each comprise a plurality of honeycomb cells, each having a diameter of between approximately 0.1 inches and 1 inch.

10. The acoustic barrel of claim 1, wherein the acoustic panel and the deep liner section each comprise a plurality of honeycomb cells, each having a diameter of between approximately 0.2 inches and 0.5 inches.

11. The acoustic barrel of claim 1, wherein the depth of the deep liner section from an inner face of the deep liner section proximate the acoustic panel to an outer face of the deep liner section is between approximately 0.5 inches and 10 inches.

12. The acoustic barrel of claim 1, wherein the depth of the deep liner section from an inner face of the deep liner section proximate the acoustic panel to an outer face of the deep liner section is between approximately 1 inch and 4 inches.

13. The acoustic barrel of claim 1, wherein the width of the deep liner section from a first surface of the deep liner section facing a forward end of the acoustic barrel to a second surface of the deep liner section facing an aft end of the acoustic barrel is between approximately 0.5 inches and 6 inches.

14. The acoustic barrel of claim 1, wherein the width of the deep liner section from a first surface of the deep liner section facing a forward end of the acoustic barrel to a second surface of the deep liner section facing an aft end of the acoustic barrel is between approximately 1 inch and 3 inches.

15. An inlet of an aircraft nacelle, the inlet comprising:
    a forward bulkhead;
    an aft bulkhead; and
    an acoustic barrel, comprising:
        an acoustic panel having a honeycomb configuration with a plurality of honeycomb cells, an inner face, and an outer face, and extending from the forward bulkhead to the aft bulkhead of the inlet,
        a deep liner section positioned outward of the acoustic panel and substantially narrower in width than the acoustic panel, the deep liner section having a honeycomb configuration, an inner face, and an outer face,
        a first back sheet substantially covering the outer face of the acoustic panel, positioned between and bonded to both the acoustic panel and the deep liner section, wherein the first back sheet comprises a plurality of holes or perforations formed into a portion of the first back sheet radially inward of and adjacent to the deep liner section, wherein the holes or perforations are slightly smaller in diameter than the honeycomb cells of the acoustic panel and are spaced to coordinate with a spacing of the honeycomb cells of the acoustic panel, and
        a second back sheet bonded to and covering the outer face of the deep liner section.

16. The inlet of claim 15, wherein at least one of the inlet, the acoustic panel, and the deep liner section form a complete 360-degree ring.

17. The inlet of claim 15, wherein the acoustic panel is a sandwich honeycomb core comprising the plurality of honeycomb cells and an acoustic septum, wherein the septum is buried within the acoustic panel and traverses the plurality of honeycomb cells, wherein the septum does not traverse the honeycomb cells located within an area radially inward of the deep liner section.

18. The inlet of claim 15, further comprising a face sheet substantially covering at least one surface of the acoustic panel, opposite of the surface covered by the first back sheet, wherein the face sheet is substantially perforated, with perforations or holes located radially inward of the deep liner section being larger than perforations or holes positioned at other locations in the face sheet.

19. The inlet of claim 18, wherein:
the deep liner section is located closer to the aft bulkhead than to the forward bulkhead;
the second back sheet is impervious; and
a portion of the first back sheet not located between the deep liner section and the acoustic panel is impervious.

20. The inlet of claim 15, wherein the acoustic panel and the deep liner section each comprise a plurality of honeycomb cells, each having a diameter of between approximately 0.1 inches and 1 inch.

21. The inlet of claim 15, wherein the depth of the deep liner section from an inner face of the deep liner section proximate the acoustic panel to an outer face of the deep liner section is between approximately 0.5 inches and 10 inches.

22. The inlet of claim 15, wherein the width of the deep liner section from a first surface of the deep liner section facing the forward bulkhead to a second surface of the deep liner section facing the aft bulkhead is between approximately 0.5 inches and 6 inches.

23. A method of attenuating frequencies in a nacelle, the method comprising:
bonding a first back sheet to an outer face of an acoustic panel comprised of a plurality of honeycomb cells;
bonding a deep liner section comprised of a plurality of honeycomb cells to the first back sheet, wherein the acoustic panel is wider than the deep liner section;
forming holes in the first back sheet throughout a portion of the first back sheet that is disposed between the deep liner section and the acoustic panel;
forming holes into a portion of a face sheet radially inward of the deep liner section, wherein the face sheet is bonded to an inner face of the acoustic panel; and
attaching the acoustic panel to the nacelle.

24. The method of claim 23, wherein the acoustic panel is a sandwich honeycomb core having a perforated septum traversing a plurality of honeycomb cells, wherein the septum is configured to not traverse the honeycomb cells of the acoustic panel that are radially inward of the deep liner section.

* * * * *